Feb. 25, 1964 A. J. STENSTROM 3,122,237

ELECTRICAL APPARATUS FOR READING AND SORTING CODE BEARING ELEMENTS

Filed Jan. 2, 1962 3 Sheets-Sheet 1

INVENTOR.
ARTHUR J. STENSTROM
BY Everett J. Schroeder
Kenneth J. Siegfried
ATTORNEYS Feb. 25, 1964 A. J. STENSTROM 3,122,237

ELECTRICAL APPARATUS FOR READING AND SORTING CODE BEARING ELEMENTS

Filed Jan. 2, 1962 3 Sheets-Sheet 2

INVENTOR.
ARTHUR J. STENSTROM
BY Everett J. Schroeder
Kenneth D. Siegfried
ATTORNEYS Feb. 25, 1964

A. J. STENSTROM

ELECTRICAL APPARATUS FOR READING AND SORTING CODE BEARING ELEMENTS 3,122,237

Filed Jan. 2, 1962

3 Sheets-Sheet 3

INVENTOR.
ARTHUR J. STENSTROM
BY Everett J. Schroeder
Kenneth D. Siegfried
ATTORNEYS United States Patent Office 3,122,237

Patented Feb. 25, 1964

3,122,237

ELECTRICAL APPARATUS FOR READING AND SORTING CODE BEARING ELEMENTS

Arthur J. Stenstrom, New Brighton, Minn., assignor to Whitehall Electronic Corporation, Minneapolis, Minn., a corporation of Minnesota Filed Jan. 2, 1962, Ser. No. 163,772

8 Claims. (Cl. 209—111.5)

This invention relates to the field of electrical apparatus and more particularly to an automatic control system for controlling the destination of articles placed upon a conveyor system.

Numerous methods and schemes have been devised for controlling the destination of articles placed upon conveyors of different types but for certain applications, disadvantages are found in some of the present day control systems. In some applications, where the code bearing medium is arranged in columns and rows and the article is somewhat limited in height, it is necessary to place the code bearing medium along a side of the article where the number of columns far exceed the number of rows of code bearing information. That is, where the code bearing medium is used to contain a binary code or similar code, generally, light reflecting elements or magnetic code retaining elements are arranged in columns and rows but generally it is more advantageous to place the largest number of code bearing elements transverse to the direction of movement of the article rather than in the direction of movement of the article. Where the code bearing elements are arranged in numerous columns which form rows that extend parallel to the direction of movement, the general practice is to use code readers which will detect all of the code bearing elements at one instance. That is, for a given reading station, the code bearing elements pass adjacent to the sensing equipment and at a particular instant when all of the code bearing elements are adjacent the code sensing devices, the reading is made. However, this presents additional problems in synchronizing the reading equipment with the code bearing elements which pass adjacent to the sensing devices and generally require additional equipment to insure that any cross-talk between the columns of code bearing elements is reduced or eliminated. Where the columns are transverse to the direction of movement of the article, and the columns can be sufficiently spaced, it will be seen that the problem is substantially eliminated in that the code sensing devices can be energized prior to the code bearing elements coming adjacent the code sensing devices, so that only one column is sensed at any given instance and for a great many applications only one column is necessary. When the columns have to be oriented very close to each other, the code either has to be read simultaneously as just described, or means must be provided to detect the code bearing elements for short durations in such a manner that the code signal information from one column is not carried over into a following column. In order to overcome this problem, additional equipment is generally required to turn the sensing devices on and off at the particular time required for a proper reading.

The present invention, employs apparatus which overcomes the problems generally associated with the arrangement of the code bearing elements as just described. Broadly speaking, the invention provides apparatus for detecting all of the code bearing elements which may be in a particular column at one time or in combination, then storing the signals representative of this code in a temporary storage unit while the sensing means is detecting the next column of code bearing elements and storing the signals representative of this code information and if additional columns are used, sequentially storing the signals representative of the codes contained on the code bearing elements in the additional columns and after all of the information has been placed in temporary storage, energizing the temporary storage elements to transfer their signals representative of the codes to a code translator which identifies all of the different code combinations and produces a discrete signal to control the conveyor through a control device. Means are also provided for resetting the various electronic switches and temporary storage units employed so that after an article has passed by the code sensing or reading apparatus that it will be in a condition or state such that the proper sequence will be used in sensing the code bearing elements on the following articles. It is contemplated that this reading of the code bearing elements in combination and then sequentially storing the information and retrieving it can be used with numerous code bearing elements where the sensor may detect metal tabs bearing magnetic codes, reflective elements used with photoelectric sensing means, and may also be used with conductive strips or elements where electrical conducting fingers determine if the code bearing element is present or not. In other words, it is contemplated that this invention may be used with numerous types of code sensing devices to accomplish the results hereinafter set forth. It should also be kept in mind that when reference is made to certain articles within the description of the invention that it not only refers to cartons, boxes, containers, etc., but could be used with materials which are loose in nature such as flour, feed, grain, etc., when used with a container for carrying the material. It is also contemplated that such apparatus would also be highly desirable for use in transporting mail within Post Office conveyor systems where it is highly desirable to place the code bearing elements on the side of the trays rather than in the bottom portions.

It is therefore a general object of the present invention to provide an improvement in automatic control apparatus for use with conveying systems for the movement of articles from one location to another.

It is another object of the present invention to provide automatic control for a conveyor system where it is not possible to orient the code pattern in long columns but is more practical to orient the code pattern in long rows and short columns.

It is still another object of the present invention to provide code detecting and code translating apparatus for automatic conveyor control of code elements arranged in long rows when used with packages of limited height.

It is still another object of the present invention to provide apparatus for reading a binary code from articles bearing such code and for translating the binary code to a number code for automatically controlling conveyor components.

It is still another object of the present invention to provide apparatus for detecting a code stored in code bearing elements and storing the code while reading another combination of code bearing elements and energizing a code translator upon the last column being detected.

It is still another object of this invention to provide apparatus for sequentially storing the code detected on each article column by column and sequentially storing the information, actuating a conveyor control device and resetting the sequentially controlled storage devices upon detection of the last code bearing element for a given article.

These and other objects and advantages of my invention will more fully appear from the following description, made in connection with the accompanying drawings, wherein like reference characters refer to the same or similar parts throughout the several views, and in which:

FIG. 6 is a schematic diagram of an embodiment of a diode matrix translator.

Figures 1, 2, 4, 5:
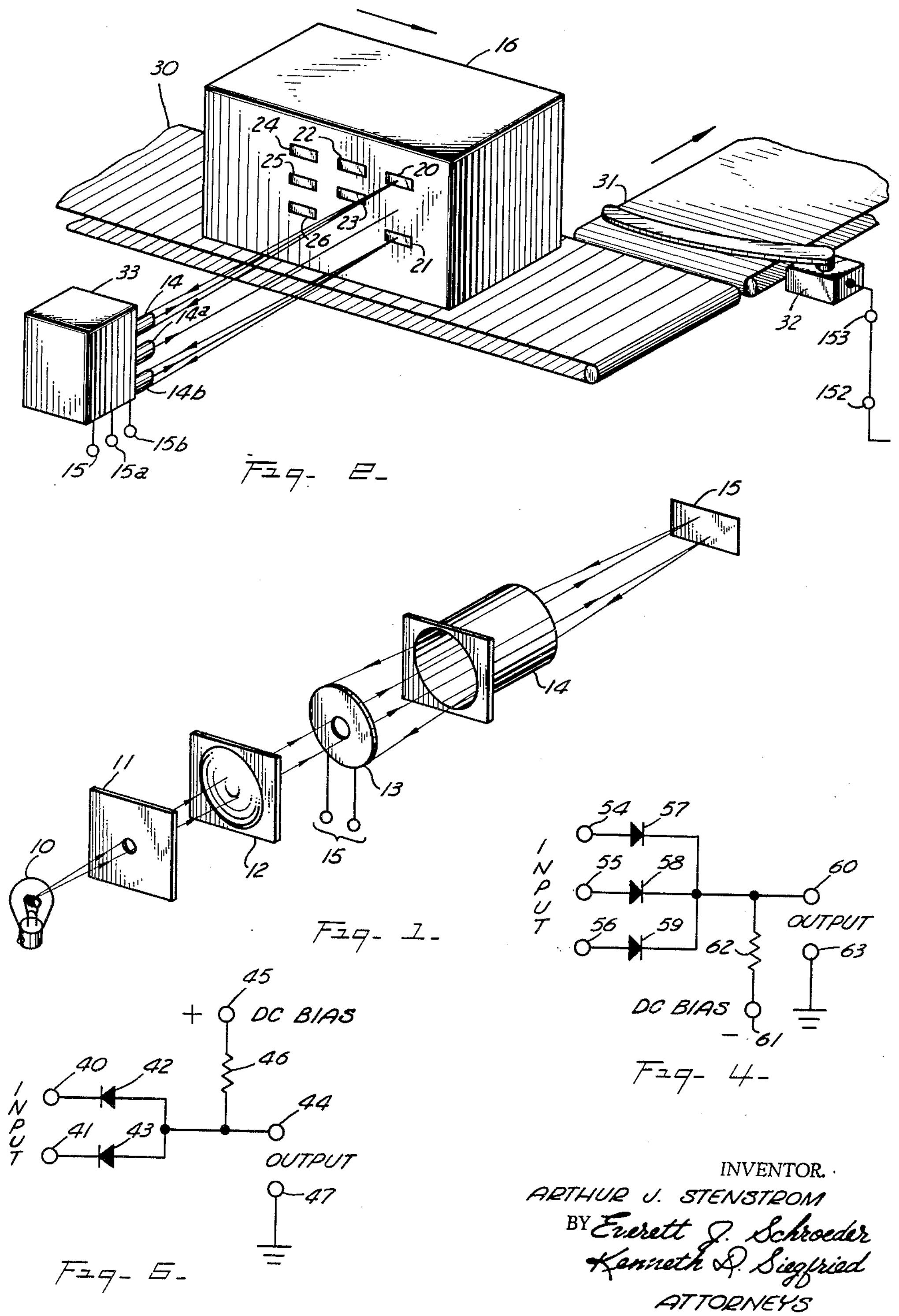
FIG. 1 shows a photoelectric code detector diagrammatically presented in detail.
FIG. 2 shows a basic diagram of an article bearing a code and its association with a conveyor and its controls.
FIG. 4 is a schematic diagram of an "OR" gating circuit.
FIG. 5 is a schematic diagram of an "AND" gating circuit.

The code detecting means is shown in FIG. 1 in the form of a light source 10 which passes its rays of light through a baffle 11, the baffle having a hole formed in its center to admit the rays of light to pass therethrough and impinge upon a lens 12. Lens 12 is a converging lens which directs the light beam through a hole in the center of a selenium or other such light sensitive element 13 forming the photoelectric cell in the shape of a washer. The light is then directed through a cylindrical object such as a light shield 14 to shield photoelectric cell 13 from stray light being reflected back towards photoelectric cell 13. The light that passes through the hole or aperture in photoelectric cell 13 impinges upon some reflective material 15 which forms the code bearing elements. In the instant application, these code bearing elements or reflective elements may be applied to the cartons by an automatic process of spraying the spots with a reflectorized paint, after being appropriately masked to provide the proper code pattern. Obviously, other means may be employed for forming the reflective surfaces. Light is then reflected from the code bearing element 15 through light shield 14 to impinge upon photo cell 13. This light sensitive device in the form of the photo cell then produces a potential difference across the photo cell and provides an electrical characteristic which may be used to determine whether a reflective element has passed in front of light shield 14 and photoelectric cell 13 or whether the area designated for the code bearing element is blank. That is, if a reflective element passes in front of light shield 14 and photoelectric cell 13, there will be a signal produced at the output leads 15 of photoelectric cell 13 whereas if there is no light reflected but generally absorbed by the article there will be no change in the electrical characteristics of the photoelectric cell and there will be no signal appearing on leads 15. When the code bearing elements are used in the binary code system, the reflecting elements produce what is generally known as the "one" signal and when there is no light reflected back to the photoelectric cell 13 it forms the "zero" designatiaon. Thus for each area which could be occupied by a code bearing element, there will be either a zero or one designation representative of that particular area. It is quite obvious that the same result can be achieved by using magnetic code bearing elements wherein the code in one instance is a "N–S" code and in the other instance is a "S–N" code. In other words, any area which is to be employed as the code bearing area which has two states, that is one in which one condition is present and one in which another condition is present is operable in this binary fashion.

In this particular embodiment, reference is made to FIG. 2 in which an article 16 has 7 code bearing elements designated as numbers 20 through 26. Article 16 is being moved in the direction of the arrow which is generally from left to right in FIG. 2 and is carried by a main conveyor 30. Situated adjacent to and immediately behind conveyor 30 is a secondary route which is part of the main conveyor system designated 31 and adjacent to both the main conveyor 30 and secondary conveyor 31 is a diverter 32. Since any type of conveyor and associated diverter may be used with this invention, it should be obvious to those skilled in the art that the details of such apparatus is not necessary to contemplate the invention set forth herein. The purpose of diverter 32 is to divert articles such as article 16 from main conveyor 30 onto secondary conveyor 31 and it can readily be seen that more than one secondary conveyor could be employed at each diverter location which is generally referred to as a diverter station. A code reader 33 houses 3 photoelectric cell code detectors and the associated illumination apparatus such as found in FIG. 1 and which is designated as employing light shields 14, 14*a* and 14*b*. It is obvious that light shields 14*a* and 14*b* along with the rest of the apparatus is identical to that shown in FIG. 1 and that the corresponding outputs of output terminals 15, 15*a*, and 15*b* are also identical. It will be seen that there are as many photoelectric cell detectors arranged in a column as there as possible code combinations in a particular column. For example, in FIG. 2 there are 3 photoelectric cells and their associated apparatus and there are 3 rows of code bearing elements in each column. It is obvious, that reflective elements 20 and 21 are in the first column and are in rows 1 and 3 where row 1 is at the top and row 3 is at the bottom of the code bearing arrangement. Row number 2 does not have a reflective element and therefore would not produce any signal at the output of terminal 15*a*. In other words, there would be signals present on terminals 15 and 15*b* but none present on 15*a*. The next column would then produce signals at the outputs of terminals 15 and 15*a* but none on terminals 15*b* and column 3 would produce signals on all of the terminals 15, 15*a*, and 15*b*.

In the use of the system just described, it should also be made apparent that there must be at least one active code bearing element in each column in order for the system to function properly. That is, there must be one reflectorized tab or magnetic bearing tab or conductive tab or other suitable materials which cooperate to produce a signal and not remain inactive. To identify various articles different combinations can be used where for example, if "*n*" designates the number of individual code areas located in a vertical column, there are $(2^n-1)$ combinations which may be used for identification. In this instance, the combination code detected would produce signals where all of the code bearing areas are read simultaneously. To increase the number of code combinations possible so that a larger number of articles may be identified, a second column of code patterns, when added to the first column increases the capabilities of the code identifying system. In this arrangement, the code detected would then be a combination and sequential reading. In other words, the signals detected from the first column of code bearing elements which would produce a certain combination code, when increased with another column and by providing the proper logic circuits to determine from which column the signals came, the capabilities can be greatly increased. In this arrangemnet, the coding system would then allow $(2^n-1)^m$ number of identifying codes, where "*n*" is equal to the number of rows of possible code bearing elements and where "*m*" is the number of vertical columns of possible code bearing elements.

Figure 3:
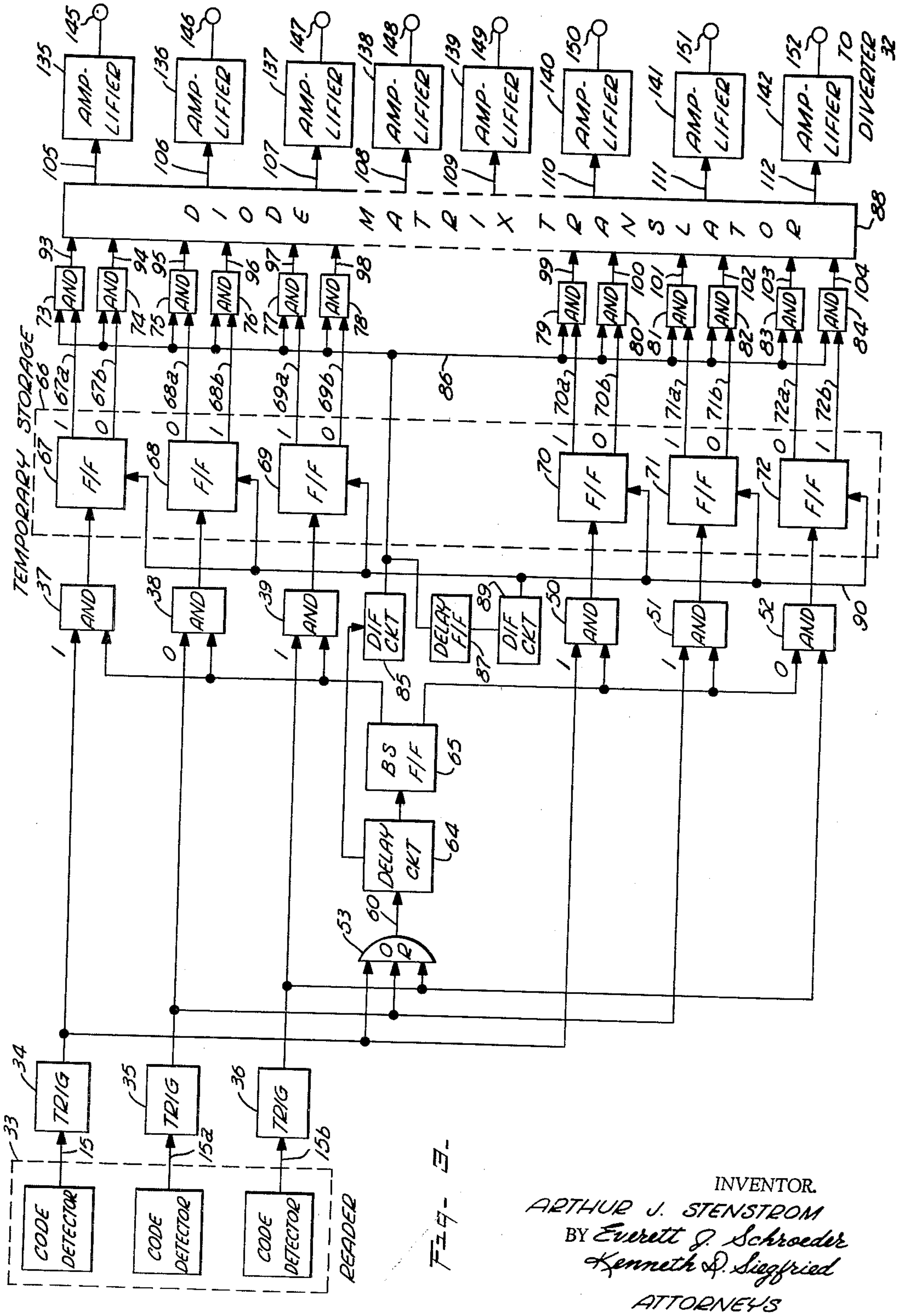
FIG. 3 is a block diagram of the conveyor control circuit showing the essential elements thereof.
Figure 8:
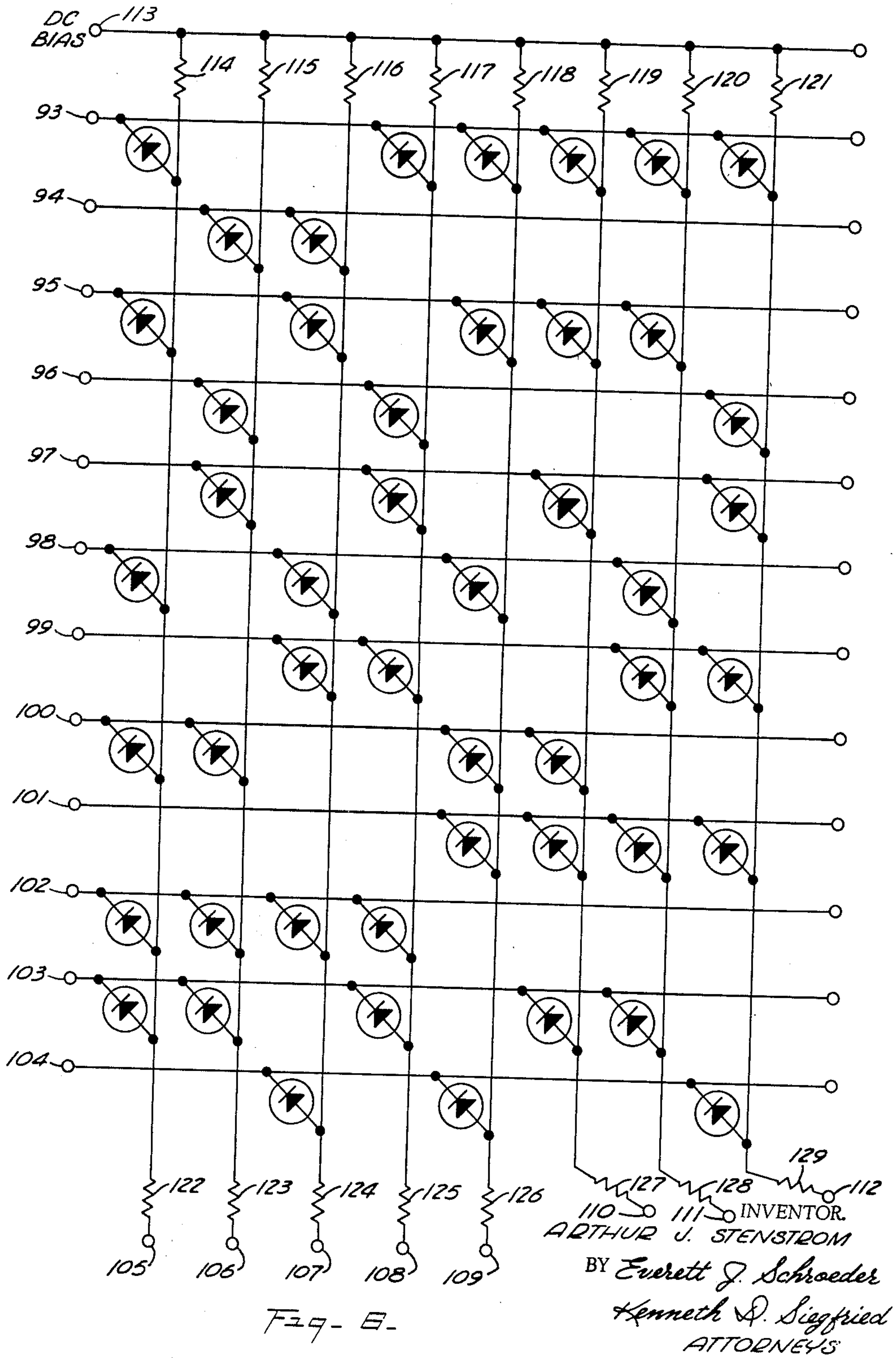

In describing the operation of the block diagram of FIG. 3, the sequence of events in the operational process will be described using the first two columns of code bearing elements as shown on the article 16 of FIG. 2. That is, it will be considered that there are code bearing elements 20 through 23 present so that there are 4 active elements and two nonactive code areas. Code reader 33 would then have a signal produced at terminal 15 which is applied to a trigger circuit 34 and inasmuch as there is no code bearing element in row 2 there will be no signal appearing on terminal 15*a* which is connected to a trigger circuit 35. Terminal 15*b* will of course have a signal present upon detecting the code bearing element 21 and terminal 15*b* is connected to a trigger circuit 36. Trigger circuits 34 through 36 provide the function of creating a definite voltage level of either "zero" or "one" for the operation of the logic circuits and one type of trigger circuit which could be usable would be a monostable or single cycle multivibrator so that upon receiving a slight change in the electrical characteristics from the photoelectric cell the trigger circuit would be driven to its other state of operation and then return to its original state of operation to receive the next signal if a code bearing element were in that particular row. It is not necessary to go into detail on the type of trigger circuit for the main purpose of the trigger circuit is to insure that a proper signal is created upon the photoelectric cell detecting a code bearing element. Therefore, trigger circuit 34 and 36 will produce an output signal and the output signal from trigger circuit 34 is applied to an "AND" circuit 37 which is sometimes referred to as a gating circuit. For a more detailed description of the AND gating circuit 37, reference is made to FIG. 5 in which a pair of input signals are applied to a pair of terminals 40 and 41 which are connected to a pair of diodes 42 and 43 respectively, the diodes being poled in the same direction and their outputs being connected to an output terminal 44. A direct current bias is applied to a bias terminal 45 which in turn is connected through a resistor 46 to output terminal 44. The other output terminal 47 is connected to ground. In this instance, two signals are required to appear at terminals 40 and 41 of the proper polarity and at the same instance in order to create a voltage sufficient to overcome the direct current bias applied at bias terminal 45. Upon this happening, an output signal appears between terminals 44 and 47. Another AND circuit 38 is connected to trigger circuit 35 at one of its inputs and another AND circuit 39 is connected to trigger circuit 36 at one of its inputs. In like manner, an AND circuit 50 is connected to trigger circuit 34, and an AND circuit 51 is connected to trigger circuit 35, and an AND circuit 52 is connected to trigger circuit 36. In other words, there are parallel connections for AND circuits 37 and 50, for AND circuits 38 and 51, and for AND circuits 39 and 52. A signal from trigger circuit 34 is also applied to an "OR" circuit 53 and this OR circuit is also connected to the output of trigger circuit 35 and trigger circuit 36. For a more detailed explanation of OR circuit 53, refer to FIG. 4 in which there are three inputs 54, 55, and 56 to which are connected three diodes 57, 58, and 59 respectively, all poled in the same direction. The other terminals of the diodes are connected to an output terminal 60 and are also connected to a direct current bias terminal 61 through a resistor 62. The other output terminal 63 is connected to ground. The bias placed upon terminal 61 is such that a signal received at any of the input terminals 54 through 56 will overcome the bias and produce an output signal. In other words, one or two or three signals may be received simultaneously and any one or all three will produce an output signal. It will be recognized that this type of circuit is required since for any given column of code bearing elements, there may be one reflector element missing to provide the "zero" designation in the binary code. The output terminal 60 is connected to a delay circuit 64. Delay circuit 64 may be in the form of a multivibrator, flip-flop, or some other device producing signal pulses separated by a predetermined time delay interval. In any event, delay circuit 64 provides a time delay to assure that the first column of code has passed from in front of the code detecting means before it changes state to operate in another state or provide another signal. Delay circuit 64 is connected to a switching means 65 which may be in the form of a bistable flip-flop or some other electronic switch. For the particular embodiment shown, a bistable flip-flop will suffice as only two states are required as will be seen later. In other applications where more than two states are required, it may be desirable to combine several flip-flops to provide a sequential switching arrangement of the different states so that the net result is that there are as many different conditions or states of operation in the switching device as there are columns in the code bearing areas. This will become more apparent as the rest of the circuit is described. Again, there are numerous types of bistable switching devices, some of which are Eccles-Jordan trigger circuits, multivibrators, and flip-flops. As the signals from trigger circuits 34 through 36 reach AND gates 37 through 39, switching means 65 is in its initial state and applies another signal to AND circuits 37 through 39 to enable these gating circuits and thus provide output signals if both input signals were received. Since there was no signal received at AND circuit 38, there will be no output signal appearing on this gate.

After delay circuit 64 applies a signal to the bistable flip-flop which is used in this particular embodiment, flip-flop 65 changes its state of operation and applies an enabling signal to AND circuits 50, 51, and 52. Upon the next column of code bearing elements appearing in front of code reader 33, the signals appearing at the outputs of trigger circuits 34 through 36 appear as one of the signals on AND gates 50 through 52 to produce output signals where two input signals were applied. Since the second column does not have a code bearing element in the bottom or third row, there will be no signals applied from trigger circuit 36 to AND gate 52 and therefore there will be no output signal at AND gate 52.

Before delay circuit 64 produces another pulse or causes bistable flip-flop 65 to change its state, there are several things which take place. A temporary code storage means 66 comprises a plurality of flip-flop circuits and in this case employs six flip-flop circuits 67 through 72 which are connected to the outputs of AND circuits 37 through 39 and 50 through 52 respectively. In other words, the output of each AND circuit is applied as an input to each of the flip-flops. Flip-flops 67 through 72 are initially in a particular state of operation as they may assume one of two states of operation but are always returned to an initial operating condition as will be explained later. The output circuit from AND gate 37 causes flip-flop 67 to produce an output signal on a terminal **67*a* and there is no signal appearing on another terminal 67*b*. Because there was no signal applied to flip-flop 68 from AND gate 38, a terminal 68*a* does not have a signal applied but a terminal 68*b* does have a signal applied to its output terminal. Flip-flop 69 has a signal applied to an output terminal 69*a* and output terminal 69*b* does not have a signal applied as it is in its cut-off state the same as terminals 68*a* and 67*b*. It will be noted that this produces the binary code detected on article 16 which carry code elements 20 and 21. In a similar manner, an output signal appears on an output terminal 70*a* of flip-flop 70 and output terminal 70*b* contains no output signal. Flip-flop 71 has an output terminal 71*a* which carries a signal and terminal 71*b* is without a signal. Because there is no input to flip-flop 72, a terminal 72*a* does not contain a signal but a terminal 72*b*** is energized with a signal.

Twelve AND circuits 73 through 84 are connected to output terminals **67*a* and 67*b* through 72*a* and 72*b* respectively. That is, output terminal 67*a* is connected as an input to AND circuit 73, output terminal 67*b* is connected to AND circuit 74, etc. In other words, the signal voltage is applied to each of the AND circuits and once the enabling voltage is applied to each of the AND circuits if the other signal is present, an output signal will be created. A second delay pulse is received from delay circuit 64 and is then applied to a differentiating circuit 85 to produce a spiked output signal which is applied to a connecting lead 86. Connecting lead 86 is connected to each of the AND gate circuits 73 through 84 to supply the enabling voltage. Thus, with the two signals present on any of the AND gate circuits 73 through 84, an output signal will be produced. At the same time that the differentiated spiked pulse is produced from differentiating circuit 85, it is applied to a delay flip-flop 87, the delay being sufficient for the signals to be transferred from AND gates 73 through 84 into a diode matrix translator 88. Delay flip-flop 87 produces an output signal to another differentiating circuit 89 and the output of the differentiating circuit is applied to a connecting lead 90. Connecting lead 90 is applied to flip-flops 67 through 72 in order to apply a reset voltage for the flip-flops and return them to their initial state. It should be quite obvious that if there are only two columns required for the particular code pattern desired, that the bistable flip-flop 65 may be connected directly to differentiating circuit 85 to apply the enabling voltage to AND gates 73 through 84 and apply the reset voltages to flip-flops 67 through 72**.

Diode matrix translator 88 is connected to AND gates 73 through 84 by a plurality of output connecting leads 93 through 104 respectively. At this point it will be seen that the state of the temporary storage flip-flops 67 through 72 is transferred to the diode matrix translator 88 to provide the code input into the diode matrix translator.

Diode matrix translator 88 is best shown in FIG. 6 and as can be recognized is generally in the form of an AND circuit which is composed of numerous diodes connected in parallel to provide a discrete number of output signals. In the embodiment shown, the twelve input signals on connecting leads 93 through 104 are applied to certain diodes to provide eight discrete output signals which appear at terminals 105 through 112. A direct current bias is applied to a terminal 113 and is connected to a plurality of resistors 114 through 121, all of which are connected in parallel. The other end of resistor 114 is connected to output terminal 105 through a resistor 122, the other end of resistor 115 is connected to output terminal 106 through a resistor 123 and in like manner, resistors 116 through 121 are connected to output terminals 107 through 112 through resistors 124 through 129. It will be seen that upon receiving inputs at terminals 93, 95, 98, 100, 102, and 103, that an output is produced on terminal 105. In order to show the input combinations required to produce a discrete output signal, reference is made to Table I.

*Table I*

| Input terminal | Output terminal | | | | | | | |
|---|---|---|---|---|---|---|---|---|
| | 105 | 106 | 107 | 108 | 109 | 110 | 1111 | 112 |
| 93 | 1 | 0 | 0 | 1 | 1 | 1 | 1 | 1 |
| 94 | 0 | 1 | 1 | 0 | 0 | 0 | 0 | 0 |
| 95 | 1 | 0 | 1 | 0 | 1 | 1 | 1 | 0 |
| 96 | 0 | 1 | 0 | 1 | 0 | 0 | 0 | 1 |
| 97 | 0 | 1 | 0 | 1 | 0 | 1 | 0 | 1 |
| 98 | 1 | 0 | 1 | 0 | 1 | 0 | 1 | 0 |
| 99 | 0 | 0 | 1 | 1 | 0 | 0 | 1 | 1 |
| 100 | 1 | 1 | 0 | 0 | 1 | 1 | 0 | 0 |
| 101 | 0 | 0 | 0 | 0 | 1 | 1 | 1 | 1 |
| 102 | 1 | 1 | 1 | 1 | 0 | 0 | 0 | 0 |
| 103 | 1 | 1 | 0 | 1 | 0 | 1 | 1 | 0 |
| 104 | 0 | 0 | 1 | 0 | 1 | 0 | 0 | 1 |

In each instance it will be noted that it requires the production of six signals in order to produce an output signal. For instance, the first two columns of code bearing elements as shown on article 16 of FIG. 2 produces output signals from AND circuits 73, 76, 77, 79, 81, and 84 and these appear on terminals 93, 96, 97, 99, 101, and 104 and it will be seen that this output signal appears at terminal 112. In each instance, the combination of the six signals overcome the D.-C. bias applied to terminal 113 to provide an output signal. The diodes shown in the matrix are the same type of diodes which are used in the AND and OR gating circuits shown in FIGS. 4 and 5.

In order that the signals appearing at the outputs of the diode matrix translator 88 are of sufficient magnitude, it may become necessary to amplify the signals and also provide impedance matching apparatus and this is shown generally as a plurality of amplifiers 135 through 142 which are connected respectively to output terminals 105 through 112. Amplifiers 135 through 142 have a plurality of output terminals 145 through 152 connected respectively thereto. For the particular embodiment shown, in regards to the circuit of FIG. 3, output terminal 152 is connected to an input terminal 153 of diverter 32 and therefore actuates diverter 32 so that article 16 would be diverted onto secondary conveyor route 31.

It should be obvious to those skilled in the art that where three columns of code bearing elements are employed, that an additional three flip-flops will be needed in the temporary code storage means 66. An additional input would be applied to OR circuit 53 and delay circuit 64 would function much as described with the exception that a final signal would be applied after the last column of code bearing elements has passed the code detectors and in order to reset the flip-flops in the temporary storage means and also enable AND gates 73 through 84. There are obviously other ways in which the same results can be accomplished, it being kept in mind that the combination signal must be first detected and then sequentially stored and all applied to the diode matrix translator at the same instant so that the translator may separate the signals into discrete signals for actuation of some control device.

From the foregoing description and teaching of the drawings, it will be seen that electrical apparatus has been shown which stores the combination signals which for this particular embodiment are binary in nature, storing them in sequence and applying them to a translator to separate them so that only one discrete output signal is received. It should also be obvious that the maximum capabilities of the translator are determined by the formula $(2^n-1)^m$ where "$n$" is the number of rows of code bearing elements and "$m$" is the number of columns of code bearing elements. In the teaching just described, it will also become apparent that there are only as many code detectors required as there are rows of code bearing elements and that a great deal of the problems associated with aligning the code bearing areas or elements along the direction of travel of a conveyor and article is overcome in the circuits and apparatus just described and a definite improvement is made over the state of the art for controlling conveyors in this manner.

It will, of course, be understood that various changes may be made in the form, details, arrangement and proportions of the parts without departing from the scope of my invention which consists of the matter shown and described herein and set forth in the appended claims.

I claim:

1. Apparatus for identifying and controlling the movement of articles from one location to another comprising:

(*a*) a conveyor for moving articles having a plurality of diverter stations and at least one secondary route constructed and arranged to be engaged by said conveyor at each of said diverter stations;

(*b*) code bearing elements attached to each article to be detected and moved by said conveyor, said code bearing elements arranged in columns and rows and having at least one code bearing element in each column;

(*c*) code reader means located in at least the first of said plurality of diverter stations encountered for detecting the code retained by said code bearing elements, said code reader means being constructed to simultaneously detect all code bearing elements arranged in a column;

(*d*) switching means responsive to said code reader means having an input and a first and second output, the input and one output being alternately connected after a predetermined time delay;

(*e*) first bistable code storage means responsive to the first output of said switching means for temporary storage of said code, said code storage means having first and second outputs, one of which is energized to produce an output signal;

(*f*) second bistable code storage means responsive to the second output of said switching means for temporary storage of said code, said code storage means having first and second outputs, one of which is energized to produce an output signal;

(g) code translating means responsive to said output signals from said first and second code storage means for translating said output signals representative of said code detected by said code reader means into a plurality of predetermined discrete signals, said translating means responding to produce said discrete signals upon all of said code bearing elements being detected;

(h) and a plurality of diverter means each energized by a discrete signal from said code translating means for diverting articles onto said conveyor secondary routes, said diverter means located at said diverter stations.

2. The invention as set forth in claim 1 including: reset means responsive to said switching means upon the last column of said code bearing elements passing said code reader means and being connected to said first and second bistable code storage means so that the operation thereof is started in the same state before said code reader means detects code bearing elements of another article.

3. Apparatus for identifying and controlling the movement of articles from one location to another comprising:

(a) a conveyor for moving articles having a plurality of diverter stations and at least one secondary route constructed and arranged to be engaged by said conveyor at each of said diverter stations;

(b) code bearing elements formed on a part of each article to be detected and moved by said conveyor, said code bearing elements having reflective surfaces and arranged in columns and rows, having at least one reflective element in each column;

(c) photo-electric code reader means located at each of said plurality of diverter stations for receiving light reflected by said reflective elements, said photo-electric code reader means being constructed to simultaneously detect all reflective elements arranged in a column;

(d) electronic switching means responsive to said photoelectric code reader means having an input and a first and second output, the input and one output being alternately connected after a predetermined time delay;

(e) first bistable flip-flop means responsive to the first output of said electronic switching means for temporary storage of said code, said code storage means having a first and second output, one of which is energized to produce an output signal;

(f) second bistable flip-flop means responsive to the second output of said electronic switching means for temporary storage of said code, said code storage means having a first and second output, one of which is energized to produce an output signal;

(g) diode matrix code translating means responsive to said output signals from said first and second bistable flip-flop means for translating said output signals representative of said code detected by said photo-electric code reading means into a plurality of predetermined discrete signals, said translating means responding to produce said discrete signals upon all of said reflective elements being detected;

(h) and a plurality of diverter means each energized by a discrete signal from said diode matrix code translating means for diverting articles onto said conveyor secondary routes, said diverter means located at said diverter stations.

4. Apparatus for identifying and controlling the movement of articles from one location to another comprising:

(a) a conveyor for moving articles having a plurality of diverter stations and at least one secondary route constructed and arranged to be engaged by said conveyor at each of said diverter stations;

(b) code bearing elements attached to each articles to be detected and moved by said conveyor, said code bearing elements arranged in "m" and "n" rows and having at least one code bearing element in each column;

(c) code reader means located in at least the first of said plurality of diverter stations encountered for detecting the code retained by said code bearing elements, said code reader means being constructed to simultaneously detect all code bearing elements arranged in a column and producing a signal for each code bearing element detected;

(d) switching means having an input responsive to said signals from said code reader means and having "m" number of outputs being sequentially connected to said input after a predetermined time delay;

(e) a plurality of temporary code storage means, each having two states of operation and being responsive to said code reader means and to one of said outputs of said switching means for sequential temporary storage of said code, there being (mxn) code storage means;

(f) a time delay means responsive to signal from said code reader means and actuated to produce an output signal after all signals have been received therefrom and connected to said temporary code storage means to simultaneously produce output signals representative of said codes held in temporary storage;

(g) code translating means responsive to said output signals from said plurality of temporary code storage means for translating said output signals representative of said code detected by said code reader means into a plurality of discrete signals, the maximum number of codes being equal to $(2^n-1)^m$;

(h) and a plurality of diverter means each energized by a discrete signal from said code translating means for diverting articles onto said conveyor secondary routes, said diverter means located at said diverter stations.

5. Apparatus for identifying and controlling the movement of articles from one location to another comprising:

(a) a conveyor for moving articles having a plurality of diverter stations and at least one secondary route constructed and arranged to be engaged by said conveyor at each of said diverter stations;

(b) code bearing elements attached to each article to be detected and moved by said conveyor, said code bearing elements arranged in columns and rows and having at least one element in each column;

(c) a plurality of code detectors located at each of said plurality of diverter stations for detecting the code retained by said code bearing elements and producing an output signal, there being as many code detectors as there are rows of code bearing elements, said code detectors being constructed to simultaneously detect all code bearing elements arranged in a column;

(d) a first gating circuit responsive to the output signals from said plurality of code detectors providing an output signal upon receiving at least one input signal;

(e) an electronic switch including a time delay circuit responsive to said output signal from said first gating circuit having an input and as many outputs as there are columns of code bearing elements, the input and one of said outputs being sequentially connected to provide an output signal after a predetermined time delay;

(f) a plurality of second gating circuits responsive to said signals from said plurality of code detectors and from one of the outputs of said electronic switch, there being as many gating circuits as the product of the number of columns and rows of code bearing elements, each of said second gating circuits producing an output signal upon receiving both input signals;

(g) a plurality of bistable code storage devices being operative in one of two conditions at any one time and being responsive to the output signals from said plurality of second gating circuits for temporary storage of said code, each of said code storage devices having a first and second output, one of which carries an output signal;

(h) a signal shaping circuit connected to said time delay circuit of said electronic switch to provide a time delayed driving signal;

(i) a plurality of third gating circuits responsive to said signals from said plurality of bistable code storage devices and from said signal shaping circuit, there being a gating circuit for each output of said plurality of bistable code storage devices, said third gating circuit producing an output signal upon receiving both input signals;

(j) a matrix code translator responsive to said output signals from said plurality of third gating circuits for translating said output signals representative of said code detected by said plurality of code detectors into a plurality of predetermined discrete signals, said translator responding to produce said discrete signals upon all of said code bearing elements being detected;

(k) a plurality of diverters, each of which is energized by a discrete signal from said code translating means for diverting articles onto said conveyor secondary routes, at least one of said diverters being located at each of said diverter stations;

(l) and a reset signal circuit connected to said signal shaping circuit to energize said plurality of bistable code storage devices to cause said devices to be operative in one of two conditions, after said translator produces said discrete signals.

6. Apparatus for identifying and controlling the movement of articles from one location to another comprising:

(a) a conveyor for moving articles having a plurality of diverter stations and at least one secondary route constructed and arranged to be engaged by said conveyor at each of said diverter stations;

(b) code bearing elements attached to each article to be detected and moved by said conveyor, said code bearing elements arranged in columns and rows and having at least one code bearing element in each column;

(c) a plurality of code detectors located at each of said plurality of diverter stations for detecting the code retained by said code bearing elements and producing an output signal, there being as many code detectors as there are rows of code bearing elements, said code detectors being constructed to simultaneously detect all code bearing elements arranged in a column;

(d) a first gating circuit responsive to the output signals from said plurality of code detectors providing an output signal upon receiving at least one input signal;

(e) an electronic switch including a time delay circuit responsive to said output signal from said first gating circuit having an input and a first and second output, the input and one of said outputs being alternately connected to provide an output signal after a predetermined time delay;

(f) a plurality of second gating circuits responsive to said signals from said plurality of code detectors and from the first output of said electronic switch, there being one gating circuit for each code detector, said second gating circuits producing an output signal upon receiving both input signals;

(g) a plurality of third gating circuits responsive to said signals from said plurality of code detectors and from the second output of said electronic switch, there being one gating circuit for each code detector, said third gating circuit producing an output signal upon receiving both input signals;

(h) a plurality of bistable code storage devices being operative in one of two conditions at any one time and being responsive to the output signals from said second and third gating circuits for temporary storage of said code, each of said code storage devices having a first and second output, one of which carries an output signal;

(i) a signal shaping circuit connected to said time delay circuit of said electronic switch to provide a time delayed driving signal;

(j) a plurality of fourth gating circuits responsive to said signals from said plurality of bistable code storage devices and from said signal shaping circuit, there being one gating circuit for each output of said plurality of bistable code storage devices, said fourth gating circuit producing an output signal upon receiving both input signals;

(k) a matrix code translator responsive to said output signals from said plurality of fourth gating circuits for translating said output signals representative of said code detected by said plurality of code detectors into a plurality of predetermined discrete signals, said translator responding to produce said discrete signals upon all of said code bearing elements being detected;

(l) a plurality of diverters, each of which is energized by a discrete signal from said code translating means for diverting articles onto said conveyor secondary routes, at least one of said diverters being located at each of said diverter stations;

(m) and a reset signal circuit connected to said signal shaping circuit to energize said plurality of bistable code storage devices to cause said devices to be operative in one of two conditions, after said translator produces said discrete signals.

7. Apparatus for identifying and controlling the movement of articles from one location to another comprising:

(a) a conveyor for moving articles having a plurality of diverter stations and at least one secondary route constructed and arranged to be engaged by said conveyor at each of said diverter stations;

(b) code bearing elements attached to each article to be detected and moved by said conveyor, said code bearing elements arranged in columns and rows and having at least one code bearing element in each column;

(c) code reader means located at each of said plurality of diverter stations for detecting the code retained by said code bearing elements, said code reader means being constructed to simultaneously detect all code bearing elements arranged in a column and producing a signal for each code bearing element detected;

(d) switching means having an input responsive to said signals from said code reader means and having a plurality of outputs being sequentially connected to said input after a predetermined time delay, the number of outputs being equal to the number of columns of said code bearing elements;

(e) a plurality of temporary code storage means, each having two states of operation and being responsive to said code reader means and to one of said plurality of outputs of said switching means for sequential temporary storage of said code, there being as many code storage means as the product of the number of columns and rows of said code bearing elements;

(f) a time delay means responsive to signals from said code reader means and actuated to produce an output signal after all signals have been received therefrom and connected to said temporary code storage means to simultaneously produce output signals representative of said codes held in temporary storage;

(g) code translating means responsive to said output signals from said plurality of temporary code storage means for translation thereof into a plurality of discrete signals;

(*h*) reset signal means responsive to said time delay means for producing a reset signal to energize said plurality of temporary code storage means so that said code storage means is caused to operate in one of said two states of operation before said code reader means detects code bearing elements from another article;

(*i*) and a plurality of diverter means each energized by a discrete signal from said code translating means for diverting articles onto said conveyor secondary routes, said diverter means located at said diverter stations.

8. Apparatus for identifying and controlling the movement of articles from one location to another comprising:

(*a*) a conveyor for moving articles having a plurality of diverter stations and at least one secondary route constructed and arranged to be engaged by said conveyor at each of said diverter stations;

(*b*) code bearing elements attached to each article to be detected and moved by said conveyor, said code bearing elements arranged in columns and rows and having at least one code bearing element in each column;

(*c*) code reader means located at each of said plurality of diverter stations for detecting the code retained by said code bearing elements, said code reader means being constructed to simulaneously detect all code bearing elements arranged in a column and producing a signal representative of a binary code for each code bearing element detected;

(*d*) switching means having an input responsive to said signals from said code reader means and having a plurality of outputs sequentially arranged to be connected to said input after a predetermined time delay, the number of outputs being equal to the number of columns of said code bearing elements;

(*e*) a plurality of temporary code storage means, each having two states of operation and being responsive to a signal representative of a binary code from said code reader means and to one of said plurality of outputs of said switching means for changing said temporary storage means from one station of operation to another, there being as many code storage means as the product of the number of columns and rows of said code bearing elements;

(*f*) a time delay means responsive to signals from said code reader means and actuated to produce an output signal after all signals have been received therefrom, and connected to said temporary code storage means to simultaneously produce output signals representative of said binary codes held in temporary storage;

(*g*) code translating means responsive to said output signals representative of a binary code from said plurality of temporary code storage means for translation thereof into a plurality of discrete signals;

(*h*) reset signal means responsive to said time delay means for producing a reset signal to energize said plurality of temporary code storage means so that said code storage means is caused to operate in the same state of operation as that when said first column of code bearing elements was detected and before said before said code reader means detects code bearing elements from another article;

(*i*) and a plurality of diverter means each energized by a discrete signal from said code translating means for diverting articles onto said conveyor secondary routes, said diverter means located at said diverter stations.

References Cited in the file of this patent

UNITED STATES PATENTS

| | | |
|---|---|---|
| 2,988,216 | Hayes et al. | June 12, 1961 |
| 3,033,448 | Quinn | May 8, 1962 |

FOREIGN PATENTS

| | | |
|---|---|---|
| 832,633 | Great Britain | Apr. 13, 1960 |
| 614,342 | Canada | Feb. 14, 1961 |

OTHER REFERENCES

Mandl, Matthew: Fundamentals of Digital Computers, N.J., Prentice-Hall, 1958.